United States Patent [19]
Kurowski

[11] Patent Number: 5,087,363
[45] Date of Patent: Feb. 11, 1992

[54] FILTERING CELL
[75] Inventor: Serge Kurowski, Neupre, Belgium
[73] Assignee: Baker-Hughes Incorporated, Houston, Tex.
[21] Appl. No.: 521,595
[22] Filed: May 10, 1990
[30] Foreign Application Priority Data
  May 12, 1989 [BE] Belgium .................... 089000519
[51] Int. Cl.⁵ ............................................. B01D 33/00
[52] U.S. Cl. ..................................... 210/328; 210/344; 210/345
[58] Field of Search ............... 210/328, 330, 332, 344, 210/345, 391, 406, 482, 488

[56] References Cited
U.S. PATENT DOCUMENTS

| | | | |
|---|---|---|---|
| 3,216,576 | 11/1965 | Roos | 210/332 |
| 3,389,800 | 6/1968 | Roos | 210/391 |
| 3,830,658 | 8/1974 | Davister | 210/391 |
| 4,172,791 | 10/1979 | Davister | 210/344 |
| 4,330,404 | 5/1982 | Davister | 210/344 |
| 4,547,288 | 10/1985 | Little | 210/330 |

Primary Examiner—Stanley S. Silverman
Assistant Examiner—Robert James Popovics
Attorney, Agent, or Firm—Choate, Hall & Stewart

[57] ABSTRACT

The filtering cell includes a tank having a base wall and a filter bed supported above the base wall which divides the tank into an upper compartment for receiving a substance to be filtered and a lower compartment for receiving a filtrate. The base wall includes an inclined end section adjoining an inclined drainage channel and further includes flow-off sections arranged on either side of the drainage channel. Because the drainage channel does not extend the full length of the cell, it can have a greater slope than in prior art cells, thereby enhancing fluid flow through the cell.

19 Claims, 2 Drawing Sheets

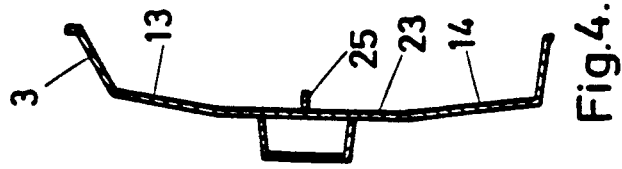
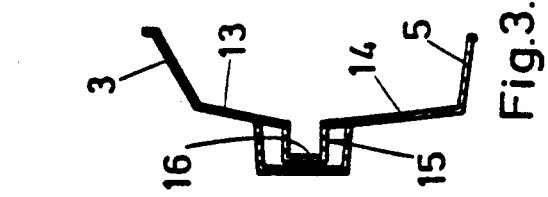
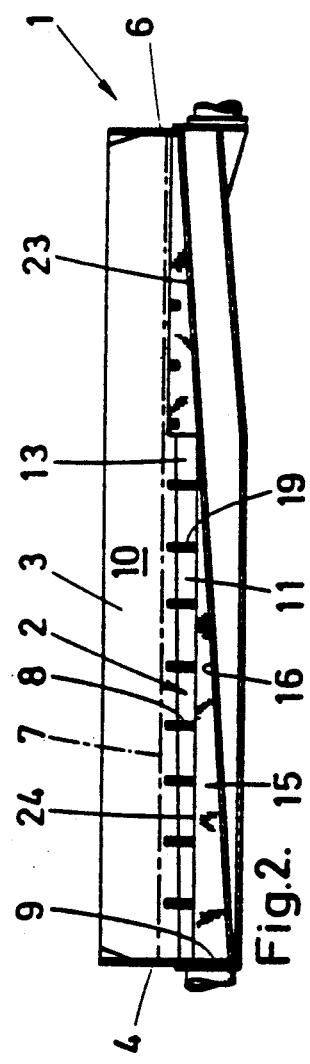
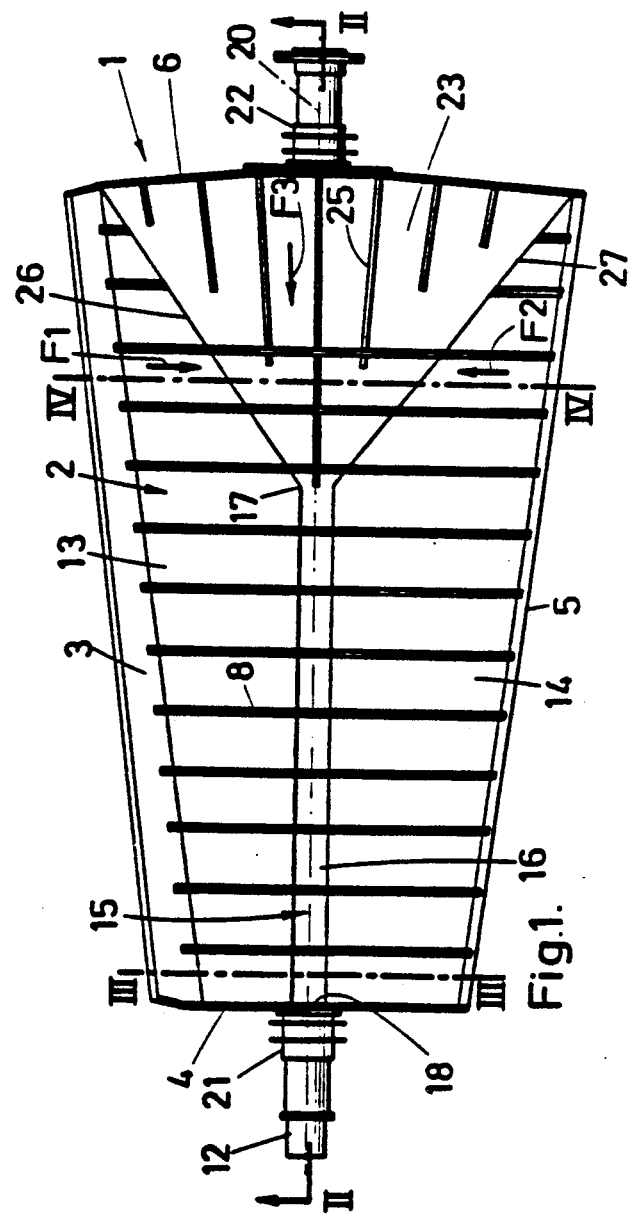

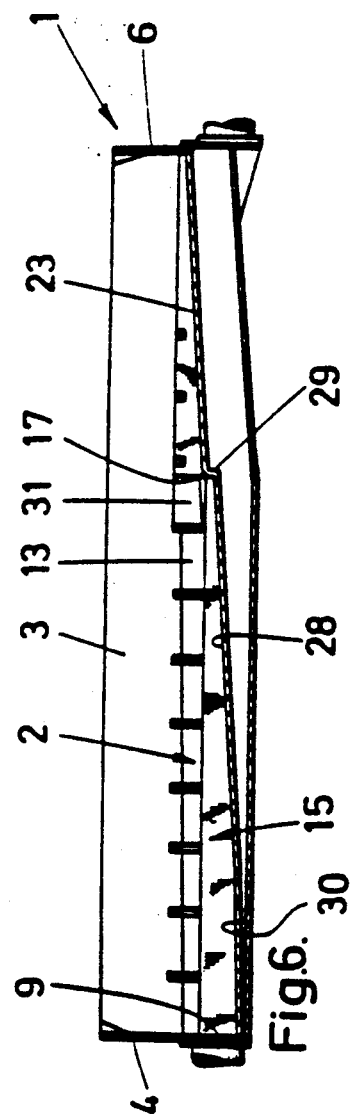
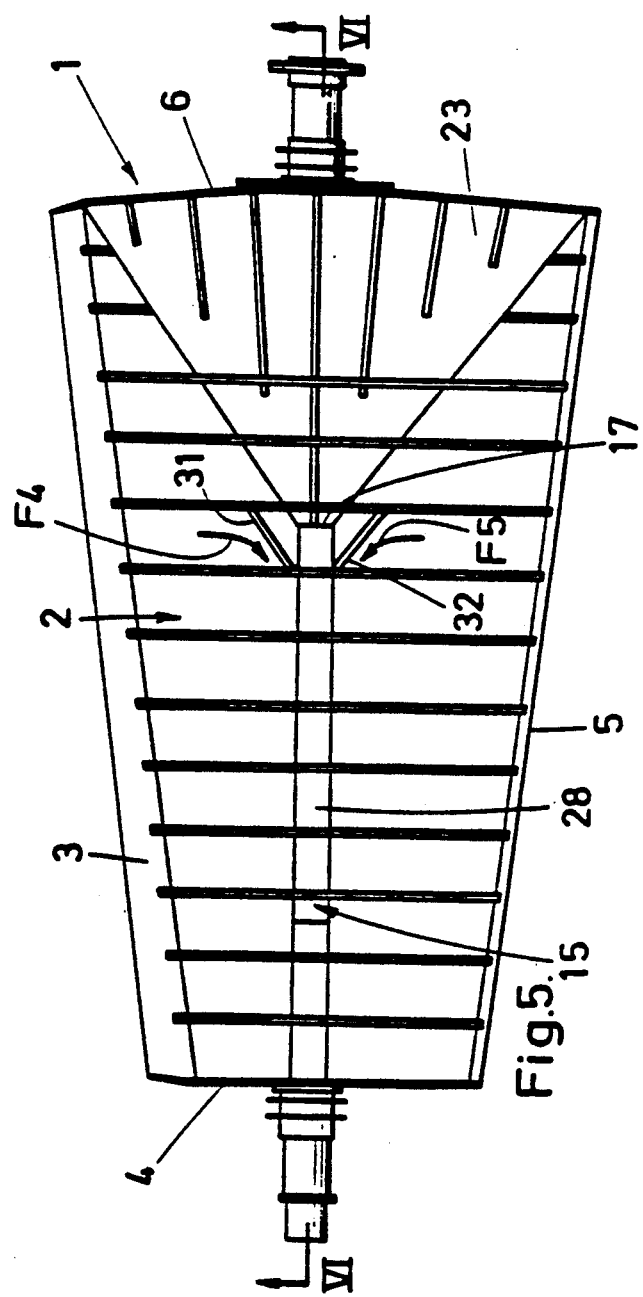

FILTERING CELL

BACKGROUND OF THE INVENTION

This invention relates to filtering cells used in the vacuum filtering of industrial sludges.

Continuous filters with horizontal filtering surfaces are often mounted on a carousel or turntable and tilt about an axis during their revolution for discharge of the filtration cake. Prior art cells of this type are shown in U.S. Pat. Nos. 3,216,576; 3,389,800; 3,830,658; 4,172,791; and 4,330,404. The latter two patents disclose filtering cells which improve the efficiency of filtrate removal as compared to the '658 patent.

In these prior art filtering cells, a filter bed is supported within a tank dividing the tank into an upper compartment for receiving a substance to be filtered and a lower compartment for receiving a filtrate. A base wall forming the bottom of the tank includes a drainage channel extending over the entire length of the cell and bordered over its entire length by two inclined planes. Because individual filtering cells are mounted in close proximity to one another and must be able to tilt, it is important for the ratio of the depth of the cell to the filtering surface area to be as small as possible. Thus, the filters are rather flat, restricting the slope of the drainage channel to a small angle, namely, approximately 1 to 2 degrees. Further, since the planes flanking the drainage channel incline toward one another, when flows from the planes merge at the drainage channel, their velocities are equal and opposite so that the merged fluid has low velocity at the drainage channel. Flow stagnation results at the top end of the drainage channel which the shallow slope of the drainage channel has difficulty in overcoming. The prior art configurations thus restrict fluid flow through the filter cell.

SUMMARY OF THE INVENTION

The filtering cell, according to the invention, includes a tank having a base wall and a filter bed supported above the base wall which divides the tank into an upper compartment for receiving a substance to be filtered and a lower compartment for receiving a filtrate. The base wall includes an inclined end section adjoining an inclined drainage channel and further includes flow-off sections arranged on either side of the drainage channel. In one embodiment of the invention, the slope of the drainage channel is constant over its length. In yet another embodiment, the drainage channel is in two parts with the part adjacent a filtrate outlet orifice having a slope less than that of a second part adjacent to the inclined end section.

In yet another aspect of the invention, the base of the drainage channel (or the second length of the drainage channel) and the inclined end section are arranged in the same plane or, in yet another alternative, in a different plane.

In yet another aspect of the invention, the end section of the base wall of the tank is arranged in a plane parallel to and above the base of the drainage channel or of a portion of the drainage channel. In this embodiment, the top end of the drainage channel is closed by a front wall which extends upwardly as far as the plane of the base wall.

In another aspect of the invention, the end section of the base wall is situated above a horizontal plane passing through the topmost point of the outlet orifice.

In still another embodiment of the invention, the end section of the base wall begins in a horizontal plane slightly below the plane of the filter bed. In another preferred embodiment of the invention, the lateral flow-off sections include baffles which divert a transversely oriented flow of filtrate obliquely toward downstream portions of the drainage channel.

The configurations of the present convention promote the unhindered flow of liquids from the top to the bottom of the filtering cell so that the outlet orifice absorbs the liquids with a maximum flow rate, this state being maintained for as long as possible.

BRIEF DESCRIPTION OF THE DRAWING

FIG. 1 is a diagramatic plan view of a filtering cell according to the invention;

FIG. 2 is a cross-sectional view of the cell taken along the line II—II in FIG. 1;

FIGS. 3 and 4 are sectional views of the cell taken along the lines III—III and IV—IV respectively in FIG. 1;

FIG. 5 is a plan view of another embodiment of the filtering cell of the invention; and FIG. 6 is a cross-sectional view of the filtering cell taken along the line VII—VII in FIG. 5.

DESCRIPTION OF THE PREFERRED EMBODIMENT

With reference to FIGS. 1-4, a filtering cell according to the invention includes a tank 1 having a base wall 2, lateral walls 3-6 extending upwardly from the base wall 2 and an upwardly facing opening. As shown in FIG. 1, the cell has an approximately trapezoidal shape, or the shape of a sector of a polygon, and this shape is selected because the cell is designed to be arranged beside other similar cells so as to form a continuous filtering device rotating in the manner of a turntable. Such devices are known and described in U.S. Pat. Nos. 3,830,658; 4,172,791; and 4,330,404, cited above. It should be understood that the filtering cell according to the invention is limited neither to this form nor to use in such equipment.

The tank 1 of the filtering cell contains a filter bed 7 shown diagramatically in FIG. 2 by a broken line. Such a filter bed is known, for example, in the above-cited patents, and it is generally composed of a support mesh on which a sheet of filter cloth rests. The support mesh is itself supported in a known manner by ribs 8 which extend substantially transversely to the cell and which serve simultaneously as stiffeners.

The filter bed 7 divides the tank 1 into an upper compartment 10 for receiving the substance to be filtered and a lower compartment 11 for the filtrate. With reference to FIG. 2, an outlet orifice 9 is provided at the bottom of the lateral wall 4 for removal of the filtrate through a removal duct 12.

The base wall of the tank 1 comprises two lateral flow-off sections 13 and 14 arranged on either side of a drainage channel 15 and inclined downwards toward the drainage channel 15. These lateral flow-off sections 13 and 14 thus form two inclined planes which start from the base of the lateral walls 3 and 5 of the tank 1. Each of the flow-off sections 13 and 14 has a slope oriented transversely to the drainage channel 15. Because the drainage channel 15 does not extend the full length of the tank 1, it is possible for the slope of the drainage channel 15 to be of the order of 3 to 8 degrees and preferably in the range of 4 to 6 degrees. This is unlike the much shallower slope possible in prior art filter cells. The drainage channel 15 has a base 16 inclined between its top end 17 and its bottom end 18 and opens out opposite the outlet orifice 9. In the region of the drainage channel 15 and laterally to it, the support ribs 8 of the filter bed 7 have openings 19 (see FIG. 2) which permit passage of liquids in the longitudinal direction of the tank 1 and, where necessary, the passage of gas.

The filtering cell of the invention is designed to be tilted about an axis 20 to facilitate removing a cake of filtered substance at the end of treatment. Two bearings 21 and 22 support the cell for pivoting about this axis. The removal duct 12 is connected to the orifice 9 through one of these bearings 21.

According to the invention, the base wall 2 includes an end section 23 which is longitudinally inclined downwardly between the lateral wall 6 (opposite the wall 4 provided with the outlet orifice 9), and the top end 17 of the drainage channel 15. Thus, the drainage channel 15 no longer extends, as in the prior art, over the entire length of the filtering cell. The result is that for the same depth of the drainage channel 15 as in the prior art, the base 16 of the drainage channel, at its bottom end 18, has a significantly steeper slope for the same length of cell as prior art cells. Depending on the length of a filtering cell, the slopes will be, for example, on the order of 4 to 8 degrees and preferably 5 to 6 degrees. Moreover, in the region situated between the top end 17 of the drainage channel 15 and the lateral wall 6 of the tank 1, it is no longer necessary for there to be a drainage channel bordered by inclined planes extending transversely to such a channel. The end section 23 may thus be raised considerably toward the lateral wall 6 up to a level just below the filter bed 7. This arrangement enables the end section 23 to have a slope which is equal to or greater than that of the base of the drainage channel 15. It is evident that the end section 23 may also have a smaller slope, depending on requirements.

As is clear in the FIG. 2 embodiment, the base of the drainage channel 15 and the end section 23 are arranged in the same plane. They therefore have the same slope from one end of the cell to the other which is also of the same magnitude as that of the lateral flow-off sections 13 and 14. In this embodiment, the upper edges 24 of the drainage channel 15 are horizontal and the height of the outlet orifice 9 is approximately equal to or less than the depth of the channel 15. The end section 23 of the base wall 2 is therefore situated, in this exemplary embodiment, entirely above the horizontal plane, passing through the top point of the outlet orifice 9.

As can be seen in the exemplary embodiment illustrated in FIGS. 1 and 4, the slopes of the lateral flow-off sections 13 and 14 follow mutually opposite directions, represented by the arrows $F_1$ and $F_2$. The slope of the end section 23, represented by the arrow $F_3$, is oriented substantially at 90 degrees relative to the slopes represented by the directions $F_1$ and $F_2$.

With reference to FIGS. 1 and 2, the means for supporting the filter bed comprise, in addition to the transverse ribs 8 described above, longitudinal ribs 25 situated on the end section 23 and oriented substantially in the direction of the slope of the end section 23.

The operation of the above-described filter cell embodiment will now be described. After the upper compartment 10 is filled with sludge to be subjected to a solid/liquid separation, the liquid filtrate flows into the lower compartment 11 with the application of a partial vacuum being applied to the compartment 11 if necessary. On the lateral flow-off sections 13 and 14 the liquids flow transversely, in the directions $F_1$ and $F_2$, either toward the drainage channel 15 or the end section 23 of the base wall 2 of tank 1. On the end section 23 liquids flow in the direction $F_3$ either toward the top end 17 of the drainage channel 15 or toward the lateral flow-off sections 13 and 14. Along the ridges 26 and 27 where the end section 23 joins the lateral flow-off sections 13 and 14, flows meet at an angle of 90 degrees. Since the slopes along the direction $F_3$ and the directions $F_1$ and $F_2$ are substantially equal, the flows have substantially equal speed. Because the currents intersect at an angle of 90 degrees, instead of cancelling each other out, these currents continue in an oblique dynamic flow toward the end 17 where they enter the drainage channel 15. Not only do the currents of filtrate enter the drainage channel 15 having preserved their kinetic properties to a large extent, but they are also introduced into a drainage channel 15 whose slope is of the same magnitude as the inclined planes formed by each of the sections 13, 14 and 23 of the base wall 2. As the liquid advances in the drainage channel 15, the kinetic energy produced by the weight of liquid originating from the top of the cell is sufficient to entrain liquids which flow off in opposite directions from the lateral flow-off sections 13 and 14. Thus, the configuration of the cell promotes the unhindered flow of liquids from the top to the bottom of the cell and enables a state to be reached as quickly as possible in which the removal duct 12 receives the liquids "open mouthed", in other words, with a maximum flow rate with this state being maintained for as long as possible.

Another embodiment of the filtering cell according to the invention is illustrated in FIGS. 5 and 6. This embodiment differs from the earlier described embodiment in that it includes additional measures to prevent any clogging of the top of the drainage channel 15. This is important in that at its top end 17, the drainage channel 15 receives the flow of from one-quarter to one-third of the filtrate passing through the filter bed 7. To minimize the risk of stagnant water forming at this point in the cell, the end section 23 is located in a plane parallel to and above the base of the drainage channel. The top end 17 of the channel joins the end section 23 by means of a front wall 29.

The sudden fall-off of the drainage channel 15 enables the channel to absorb a greater unit quantity of liquid. It is preferable to preserve a steep inclination on the order of 3 to 8 degrees, preferably 4 to 6 degrees, depending on the length of the cell in the top part of the channel 15. So that the base wall 2 remains above the low point of the outlet orifice 9, a length 30 with a more gentle slope is provided in the lower part of the channel 15. The length 30 should be kept as short as possible.

The entrainment by the mass of liquid coming from the top of the cell is sufficient to prevent the flow from being unfavorably influenced by the gentle slope (on the order of 1 to 3 degrees) of the length 30. Furthermore, each of the lateral flow-off sections may include baffles 31 and 32. These baffles deflect a transversely oriented flow so as to direct the flow obliquely (represented by the arrows $F_4$ and $F_5$) toward a part of the channel situated further downstream. The baffles 31 and 32 thus contribute to preventing stagnation of the filtrate at the end 17 of the drainage channel 15.

The rotating filtering devices disclosed in U.S. Pat. Nos. 4,172,791 and 4,330,404 enable a filtering cell to perform a complete revolution on the turntable in 2.5 minutes, which represents a great improvement compared to earlier cells, in particular, with better performance in terms of the recovery of the filtrate. The use of cells according to the present invention will now enable a complete revolution in 1.5 minutes with no loss of filtering surface. It should be noted that the cells according to the invention having the same outer dimensions as prior art cells may be applied to existing apparatus without any modification. It should be understood that the present invention is in no way limited to the embodiments described above and that modifications may be made without going beyond its scope. For example, the cells may have a rectangular shape for use in apparatus in which the cells displace linearly. The cells according to this invention also do not necessarily have to tilt about an axis.

Other variations are also contemplated for the lateral and end flow-off sections of the base wall. In particular, the drainage channel could have a width increasing towards the end 17 and have a base which is rounded in cross-section. The cell may also be configured to have one or more guide elements in order to split up, direct, and distribute the fluids at their inlet to the drainage channel in adjacent and substantially parallel currents. Such guide elements have been disclosed, for example, in the '791 and '404 patents cited above. An asymmetrical arrangement of the flow-off sections 13 and 14 on either side of the drainage channel 15 may also be utilized. Furthermore, a drainage channel placed against one of the lateral walls 3 or 5 and bordered by a single lateral flow-off section 13 or 14 is included within the scope of the invention. Finally, it should be noted that the baffles 31 and 32 may extend between several ribs 8 and not just between two of them as shown in FIGS. 5 and 6.

What is claimed is:

1. Filtering cell comprising:
   a tank including a base wall and having a filter bed supported above the base wall thereby dividing the tank into an upper compartment for a substance to be filtered and a lower compartment for a filtrate, the base wall including a longitudinally inclined end section adjoiningly aligned with an inclined drainage channel, and transversely inclined flow-off sections arranged on either side of the drainage channel, the longitudinally inclined end section extending substantially the full width of the base wall at its widest portion and substantially the full width of the drainage channel at its narrowest portion.

2. The filtering cell according to claim 1, wherein the slope of the inclined drainage channel is fixed.

3. The filtering cell according to claim 1, wherein the drainage channel comprises a first length having a slope less than that of a second length which adjoins the inclined end section.

4. The filtering cell according to claim 1, wherein the flow-off sections have a slope in the range of approximately 3 to 8 degrees and the inclined end section and the drainage channel also have a slope in the range of approximately 3 to 8 degrees.

5. The filtering cell of claim 1, wherein the drainage channel and inclined end sections have different slopes.

6. The filtering cell according to claim 1, wherein the inclined end section is arranged in a plane parallel to and above the inclined drainage channel.

7. Filtering cell comprising:
   a tank including a base wall and having a filter bed supported above the base wall thereby dividing the tank into an upper compartment for a substance to be filtered and a lower compartment for a filtrate, the base wall including an inclined end section adjoining an inclined drainage channel, and flow-off sections arranged on either side of the drainage channel wherein the drainage channel and the inclined end section are arranged in the same plane.

8. Filtering cell, comprising
   a tank comprising a base wall, lateral walls extending upwards from the base wall and an upwardly facing opening,
   a plane filter bed supported in the tank and dividing the latter into an upper compartment for the substance to be filtered and a lower compartment for the filtrate,
   an outlet orifice for the filtrate, provided at the bottom of one of the above-mentioned laterals walls,
   the base wall of the tank comprising two lateral flow-off sections arranged on either side of a drainage channel; and inclined downwards towards the latter,
   the drainage channel itself having a base inclined between a top end and a bottom end, its bottom end opening out opposite the outlet orifice, wherein the base wall comprises a longitudinally inclined end section which is arranged inclined downwards between a second lateral wall of the tank, opposite the first above-mentioned lateral wall, and the top end of the drainage channel the longitudinally inclined end section extending substantially the full width of the base wall at its widest portion and substantially the full width of the drainage channel at its narrowest portion.

9. Filtering cell according to claim 8, wherein the slope of the base of the drainage channel is invariable.

10. Filtering cell according to claim 8, wherein the drainage channel comprises, at its bottom end, a first length provided with a slope less than that of a second length situated at its top end.

11. Filtering cell according to one of claims 8–10 wherein the base of the drainage channel and the end section of the base wall of the tank are arranged in a same plane.

12. Filtering cell according to one of claims 8 to 10, wherein the base of the drainage channel has a slope different from the slope of the end section of the base wall of the tank.

13. Filtering cell according to one of claims 8 to 10, wherein the end section of the base wall of the tank is arranged in a parallel plane above the base of the drainage channel and in that the top end of the drainage channel is closed by a front wall which extended upwards as far as the above-mentioned plane.

14. Filtering cell according to any one of claims 8 to 10, in which the two lateral flow-off sections have a slope of approximately 3° to 8°, wherein the end section of the base wall and the base of the drainage channel also have a slope of 3° to 8°.

15. Filtering cell according to any one of claims 8 to 10, in which the two lateral flow-off sections 13, 14 have a slope of approximately 3° to 8°, wherein the end section of the base wall and the base of the second length of the drainage channel have a slope of 3° to 8°, and in that the base of the first length of the drainage channel has a slope of the order of 1° to 2°.

16. Filtering cell according to any one of claims 8 to 10, wherein the end section of the base wall is situated above a horizontal plane passing through the top point of the outlet orifice.

17. Filtering cell according to any one of claims 8 to 10, in which the slopes of the lateral flow-off sections follow, in a plan view, mutually opposite directions, wherein the slope of the end section of the base wall has a direction oriented substantially at 90° relative to the above-mentioned slopes.

18. Filtering cell according to any one of claims 8 to 10, wherein the end section of the base wall of the tank is connected to the said second lateral wall of the latter in a horizontal plane slightly below the plane filter bed.

19. Filtering cells according to any one of claims 8 to 10, wherein the lateral flow-off sections each have a baffle which deviates a transversely oriented flow of filtrate to a part of the drainage channel situated at the top end of the latter, so as to direct this flow obliquely towards a part of this channel situated further downstream.

* * * * *

UNITED STATES PATENT AND TRADEMARK OFFICE
CERTIFICATE OF CORRECTION

PATENT NO. : 5,087,363
DATED : February 11, 1992
INVENTOR(S) : Serge Kurowski

It is certified that error appears in the above-identified patent and that said Letters Patent is hereby corrected as shown below:

Column 3, line 19: delete "cutlet" and insert therefor --outlet--.

Signed and Sealed this

Twenty-first Day of December, 1993

Attest:

BRUCE LEHMAN

Attesting Officer   Commissioner of Patents and Trademarks